United States Patent [19]

Smith, Jr. et al.

[11] 4,122,338
[45] Oct. 24, 1978

[54] THERMAL NEUTRON DIE AWAY LOGGING SYSTEM WITH OPTIMIZED GATING

[75] Inventors: Harry D. Smith, Jr.; Robert W. Pitts, Jr., both of Houston, Tex.

[73] Assignee: Texaco Inc., New York, N.Y.

[21] Appl. No.: 809,574

[22] Filed: Jun. 24, 1977

[51] Int. Cl.² ............................................. G01V 5/00
[52] U.S. Cl. .................................. 250/262; 250/269; 250/270
[58] Field of Search .................. 250/262, 269, 270

[56] References Cited

U.S. PATENT DOCUMENTS 4,046,764  9/1977  Marquis .................. 250/270 X
4,055,763  10/1977  Antkiw .................... 250/270

Primary Examiner—Davis L. Willis
Attorney, Agent, or Firm—Carl G. Ries; Thomas H. Whaley; William J. Beard

[57] ABSTRACT

A system for measuring the thermal neutron lifetime of earth formations in the vicinity of a well borehole is disclosed. A downhole sonde is equipped with a pulsed neutron source, a thermal neutron or gamma ray detector and a pair of measurement electrodes. The measured salinity of the borehole fluid is used to optimize the delay time to the opening of measurement gating intervals for signals from the detector.

10 Claims, 3 Drawing Figures

THERMAL NEUTRON DIE AWAY LOGGING SYSTEM WITH OPTIMIZED GATING

BACKGROUND OF THE INVENTION

This invention relates to in-situ measurements of earth formations traversed by a well borehole. In particular, the invention relates to the measurement of the thermal neutron lifetime or thermal neutron decay time of earth formations in the vicinity of a well bore.

BRIEF DESCRIPTION OF PRIOR ART

At present there are two principal commercial techniques used for measuring, in-situ, the thermal neutron lifetime or thermal neutron decay time of earth formations in the vicinity of a well borehole. These neutron lifetime measurements have proven to be particularly valuable in evaluating earth formations in cased well boreholes. In both of these techniques a logging instrument which traverses the well bore utilizes a pulsed source of fast neutrons.

In the first of these measurement techniques the neutron source is repetitively pulsed. For each fast neutron pulse a cloud of fast neutrons is injected in a generally spherically symmetric fashion about the source to the surrounding earth formation. The fast neutron cloud passes from the well bore, through the drilling mud or fluid in the borehole, through the wellbore casing and the cement sheath between the casing and earth formation surrounding the wellbore. Each such pulse of fast neutrons has approximately a constant intensity and lasts typically for a time duration of from 20 to 50 microseconds. This time lapse is generally adequate create a thermalized (or low energy) neutron population in the earth formation and borehole. The number of thermal neutrons comprising this cloud or population then decays exponentially after cessation of the neutron pulse due to the capture of the thermalized neutrons by the nuclei of formation and borehole elemental components.

In this first measurement technique, after an initial fixed time period of about 300 microseconds, during which it is assumed that resultant gamma ray effects in the borehole mud and casing are substantially dissipated, measurements are made of the number of thermalized neutrons in the vicinity of the well tool during two successive predetermined length time intervals. These measurements can be used to define an exponential decay curve for the thermal neutron population in the earth formation surrounding the borehole.

It is not known with certainty using this technique whether some component of the borehole thermal neutron decay time or the earth formation thermal neutron decay time is being measured due to the fact that in this technique the assumption is made that the time delay prior to the two measurement intervals is sufficient for the substantial dissipation of effects due to the capture of thermal neutrons by the borehole fluid material. In other words, it is assumed that the borehole thermal neutron decay time is substantially shorter than the thermal neutron decay time of the earth formation surrounding the borehole. This assumption is generally correct if the borehole is filled with a drilling fluid having a high chlorine or salt water content. However, in boreholes containing air, gas, fresh water or oil base muds, the relationship does not always hold. Moreover, by making this fixed delay time to the opening of the counting gates sufficiently long (i.e. 300 microseconds) to account for any borehole component, the count rates in the time gates are lowered, thereby worsening the statistics of the counting techniques.

In the present invention, actual measurements of the salinity of the borehole fluid are made and these measurements are used to control the time delay prior to opening the first measurement gate interval for detecting capture gamma rays due to the capture of the thermalized neutrons by elements in the earth formations surrounding the borehole. Accordingly, the present invention overcomes the aforementioned limitations of this first prior art measurement technique by optimizing or minimizing the time delay before the initiation of the first measurement gates until the borehole component adequately dissipates.

Measurements of the number of thermalized neutrons in the vicinity of the well tool during the two successive time intervals following the initial time lapse to allow for dieaway of borehole effects can be used to define an exponential decay curve for the thermal neutron population in the earth formations in the vicinity of the borehole. In this first prior art measurement technique, two time intervals (or time gates), for example, can be fixed between 400–600 microseconds following the neutron burst and between 700–900 microseconds following the neutron burst in typical earth formations and under borehole conditions wherein a saline fluid or high chlorine content salt is present in the borehole fluid.

If neutron diffusion effects are ignored the relationship for the decay of a thermal neutron population in a homogeneous medium having a thermal neutron macroscopic capture cross-section $\Sigma$ can be expressed as $$N_2 = N_1 e^{-\Sigma v t} \tag{1}$$

wherein $N_1$ is the number of thermal neutrons at a first point in time $t_1$; $N_2$ is the number of thermal neutrons present at a later point in time $t_2$, $e$ is the napierian logarithm base; $t$ is the time between the two measurements $(t_2-t_1)$; and $v$ is the velocity of the thermal neutrons. The macroscopic thermal neutron capture cross-section $\Sigma$ of a reservoir rock (which can be obtained from Equation 1) is dependent upon its porosity, the formation water salinity and the quantity and type of petroleum contained in the pore spaces therein. Thus, measurement of the macroscopic cross-section $\Sigma$ is a valuable measurement to obtain.

When neutrons from the high energy neutron source interact with materials in a well bore with surrounding earth formation, they are slowed down and lose energy. A primary agent for slowing down neutrons is hydrogen which is readily available in water and hydrocarbons. After the fast neutrons have been slowed down they are captured by formation nuclei and, in general, will generate characteristic capture gamma rays before returning to a stable state. It is the capture gamma rays which are detected during the two different time intervals of measurement used in the system for measuring the thermal neutron decay time. The number of such gamma rays detected is proportional to the thermal neutron population in the vicinity of the well tool. Alternatively, thermal neutrons themselves can be detected during these two separate time intervals by the use of a helium$^3$ or boron trifluoride detector if desired. Thus, by means of the two fixed time gating measurements with a fixed time delay following the neutron burst, the thermal neutron macroscopic capture cross-section $\Sigma$ can be determined.

A second prior art technique for measuring thermal neutron decay, or thermal neutron lifetime uses the reciprocal of the macroscopic thermal neutron capture cross section $\Sigma$ which is defined in terms of $\tau$, the time constant for absorption of thermal neutrons. A relationship analogous to Equation 1 but defined in terms of $\tau$ is given by:

$$N = N_o e^{-t/\tau} \qquad (2)$$

where $\tau$ equals $1/v\tau$.

Here N is the thermal neutron density at any time $t$. $N_o$ is the thermal neutron density at an initial time $t_o$; $e$ is the napierian logarithm constant; $\tau$ is the time required for the thermal neutron population to decay to $1/e$ of its value at $t_o$.

In measuring the thermal neutron decay time using this second prior art technique, the well logging equipment obtains counts of capture gamma rays during two successive time intervals following the neutron burst to define the exponential decay curve described previously. In this technique, however, the two time intervals of the measurement are defined as a function of the $\tau$ actually measured during a previous measurement cycle. The value of $\tau$ previously measured is used to establish the duration of the neutron burst for the generation of the fast neutrons, the waiting interval to the opening of the first time gate, the duration of the first time gate for measurement, the duration of the second measurement time gate, and the duration of any background subtraction time gates. All of these times are functionally related to $\tau$ as measured on some previous neutron burst. This technique is commonly referred to in the art as the "sliding gate" technique.

One shortcoming of this technique is that in boreholes having low salinity therein, the measurement gates can actually be moved relative to the neutron burst to the point where a portion of the borehole component of the thermal neutron decay time can affect the measurement. This is particularly true in low salinity, or oil base mud borehole fluid. In such a case, the $\tau$ for the borehole may be as long as or longer than the $\tau$ for the earth formations surrounding the borehole. Thus, a short earth formation $\tau$ is measured and the "sliding gates" may slide back onto a portion of the thermal neutron decay time curve which is affected by the borehole component. In such case, an inaccurate measurement of the macroscopic thermal neutron capture cross-section $\Sigma$ (or thermal neutron decay constant $\tau$) would be affected by the borehole fluid.

In the present invention, however, measurements are made of the salinity of the borehole fluid. These measurements are used to control the delay time to the opening of the first capture gamma ray measurement gate based on a measurement of the electrical conductivity (and hence the salinity) of the borehole fluid in such a manner than the opening of the measurement gates are optimized or minimized.

BRIEF DESCRIPTION OF THE INVENTION

In the present invention, a well logging tool is provided having a pulsed source of fast neutrons and a gamma ray detector (or alternatively a thermal neutron detector). Dual detector or systems may also be utilized if supplemental information, such as formation porosity, is desired, as is well known in the art. The neutron source generates pulses of fast neutrons which are introduced into the media surrounding the well borehole and result in a thermal neutron population being generated from the slowing down of the fast neutrons in the media and in the borehole fluid itself. The well logging tool is also equipped with measurement electrodes to measure the salinity of the borehole fluid. The salinity measurement is used to determine the delay time from the end of a neutron burst to the opening of the first measurement gate to be used for measuring the capture gamma rays from earth formations in the vicinity of the borehole. By thus functionally relating the delay time to the opening of the measurement gates in accordance with the salinity of the borehole fluid, the time gating arrangements for measurement of the capture gamma rays due essentially only to the formation component of thermal neutron decay time may be optimized for maximum formation count rate. Appropriate electronic circultry for performing this optimization is disclosed.

The invention is best understood by reference to the following detailed description thereof, when taken in conjunction with the corresponding drawings in which:

DESCRIPTION OF THE PREFERRED EMBODIMENTS

Figure 1:
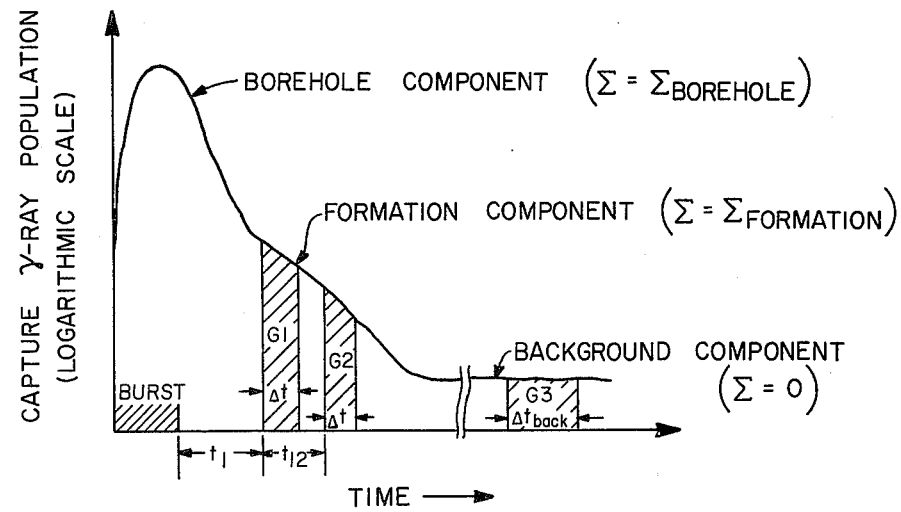
FIG. 1 is a schematic graphical representation illustrating the decay of a thermal neutron population as a function of time in the vicinity of a well borehole.

Referring, initially to FIG. 1, a graphical representation illustrating the capture gamma ray population, which is proportional to the thermal neutron population, in the vicinity of a well borehole following a pulse of fast neutrons is illustrated schematically. It will be observed that during the burst the thermal neutron population builds up quite rapidly due to the slowing down of the fast neutrons by hydrogenous materials in the vicinity of the borehole to reach a peak approximately at the cessation of the neutron burst. Subsequent to this the thermal neutron population begins to decay because of the capture of the thermal neutrons by the nuclei of elements comprising the borehole fluid, casing, cement sheath, and the earth formation around the borehole. This decay may be shown from first principles to be generally exponential in form. It is an object in measuring the earth formation thermal neutron capture cross-section $\Sigma$ to measure the slope of the thermal neutron population decay curve. This is done by sampling this population in measurement gates $G_1$ and $G_2$.

FIG. 1 also shows a background gate, $G_3$ which may be of a somewhat longer duration than measurement gates $G_1$ and $G_2$, which is used to determine the natural and activation background gamma radiation level during the period of the measurement. More accurate results can be obtained if this background gamma radiation component is subtracted from the measurements made during the $G_1$ and $G_2$ measurement time intervals.

Figure 2:
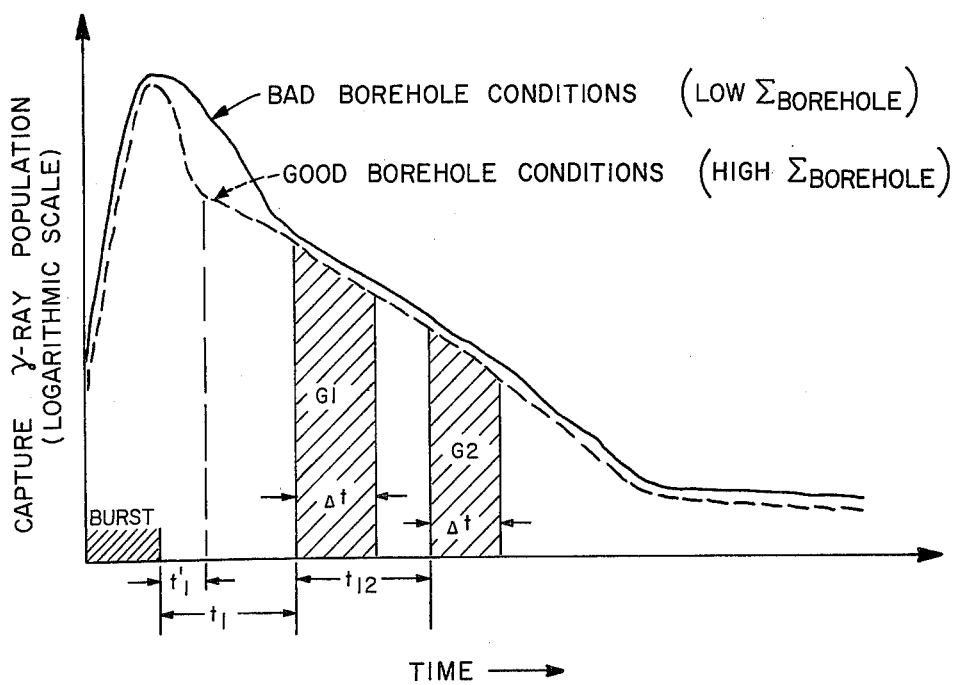
FIG. 2 is a schematic graphical illustration showing how the exponential decay curve of thermal neutron populations in the vicinity of a wellbore can vary with the salinity of the borehole fluid and FIG. 3 is a schematic block diagram illustrating a well logging system in accordance with the concepts of the present invention.

The afore described thermal neutron measurements systems place their measurement time gates on the portion of the decay curve due to the earth formation components while hopefully allowing a sufficient time interval $t_1$ to expire so that the effects due to the capture of gamma rays by materials inside the borehole can die away. However, this time delay $t_1$ is a function of the salinity or chlorine content of the borehole fluid. In relatively fresh water filled boreholes the borehole component may die out at a much slower rate than that encountered in a borehole filled with relatively highly saline or high chlorine content fluid. The difference in these borehole salinities on the thermal neutron die-away is illustrated in FIG. 2. It will be observed from FIG. 2 that unless care is used in the placement of the measurement gates $G_1$ and $G_2$ that it is possible that the gates may be placed in such a position on the time axis that the borehole component contributes significantly to the counts made during the first measurement interval $G_1$. In the present invention, this shortcoming is avoided by making a separate measurement of the borehole salinity using measurement electrodes on a well logging sonde and by then timing the delay $t_1$ to the opening of the first measurement gate $G_1$ as a optimized function of the measured borehole salinity. This is accomplished by the use of a measurement system such as that illustrated in FIG. 3.

Figure 3:
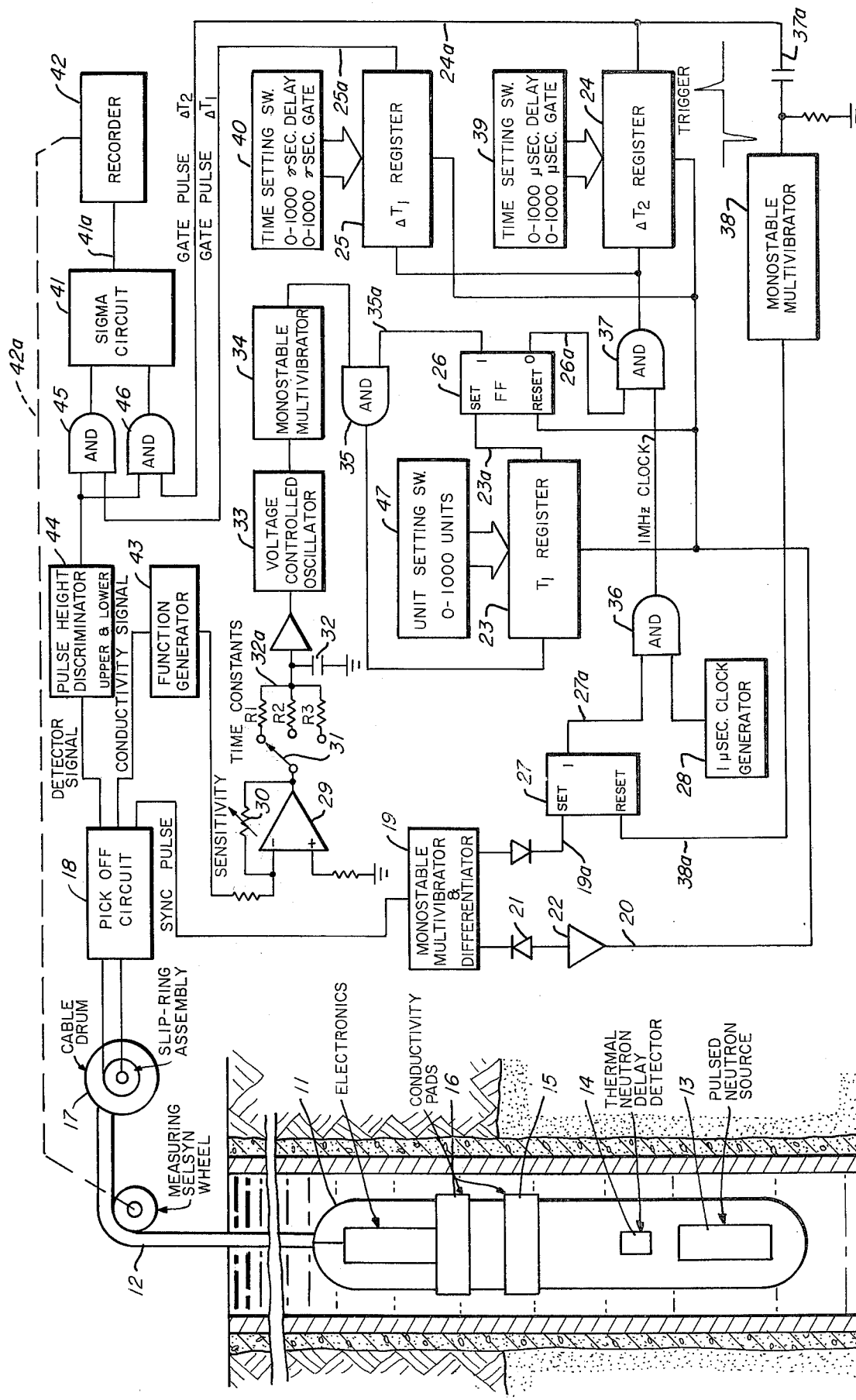

Referring now to FIG. 3, a well logging system in accordance with the concepts of the present invention is illustrated in a schematic block diagram form. A downhole well logging instrument or sonde 11 which comprises a fluid tight, pressure resistant steel housing member is illustrated suspended via a well logging cable 12. The cable 12 is a conventional well logging cable of the armored outer sheath type and having one or more central conductors therein for communicating signals to and from the surface equipment to the downhole instrument 11.

The downhole instrument 11 is provided near the lower end thereof where a pulsed neutron source 13 which may comprise for example, an evacuated deuterium-tritium accelerator tube type source as known in the art. Spaced apart from the pulsed neutron source 13 is a thermal neutron decay detector 14 which may comprise a thalium doped sodium or cesium iodide crystal for detecting thermal neutron capture gamma rays, or a helium$^3$ or boron trifluoride detector for detecting thermal neutrons.

Longitudinally separated from the detector 14 are a pair of conductivity electrodes 15 and 16. Electrode 15 is a current emitting electrode which emits current into the borehole fluid surrounding the downhole sonde 11 and electrode 16 is a measurement electrode which measures the amount of current arriving from the current emission electrode 15. This current is, of course, inversely proportional to the resistivity of the borehole fluid. The resistivity in turn is related to the salt or sodium chloride content of the borehole fluid. The borehole salinity may be related directly by means of laboratory calibration to the thermal neutron decay time thermal neutron lifetime, or macroscopic cross-section $\Sigma$ of the borehole fluid.

Signals from the measurement instrumentation in the downhole sonde 11 are conducted to the surface via cable 12 conductors. A slip ring assembly 17 is used to conduct the signals from the cable conductor to pick off circuits 18. The pick off circuits 18 are electronic circuits which decouple the signals from the downhole instrumentation and separate the downhole instrumentation signals into three separate components.

The first component separated from the downhole signals is a "sync" pulse or synchronization pulse which is transmitted from the pulsed neutron source 13 to the surface each time a pulse of high energy neutrons is emitted by the source 13. The second signal from the downhole instrumentation is the aforementioned borehole fluid conductivity signal which is representative of the current measured at measurement electrode 16 in the downhole sonde. The Third signal component conducted to the surface from the downhole sonde 11 comes from the thermal neutron decay time detector 14. These signals may comprise a series of randomly occurring voltage pulses indicative of either the gamma ray or thermal neutron population in the vicinity of the downhole detector 14.

In operation, the system illustrated in FIG. 3 provides neutron pulses of approximately 50 microseconds duration and repeated at approximately 1,000 pulses per second. A sync pulse appears appears on the line labelled "sync pulse" once each milliseconds or 1,000 microseconds. The sync pulses are supplied as input to a monostable multivibrator and differentator 19. Upon receipt of the sync pulse monostable multivibrator 19 generates reset pulses on line 20 via diode 21 and amplifier 22. The reset pulses provided on line 20 are used to reset a $t_1$ register 23, a $\Delta t_2$ register 24, and a $\Delta t_1$ register 25. The reset pulse provided on line 20 also resets a flip-flop 26. A few micro-seconds later, the monostable multivibrator and differentator 19 provides a set pulse on line 19a which is supplied to set flip flop 27. Upon receipt of the sync pulse on line 19a flip flop 27 provides an output voltage level to condition AND gate 36 via line 27a. The function of AND gate 36 will be described in more detail subsequently.

Signals representative of the conductivity of the borehole fluid are supplied from pick off circuit 18 to a function generator 43. Function generator 43 is an analog circuit designed to provide an output voltage which is functionally related to the borehole conductivity and representative of the thermal neutron capture cross-section of the borehole fluid having a particular conductivity. This voltage level signal is amplified by an amplifier circuit 29 whose sensitivity maybe adjusted via sensitivity adjustment potentiometer 30. The amplified voltage level is supplied via switch 31 to an integrator circuit comprising a capacitor 32 and associated resistor network 32a, any one of which may be selected by switch 31 to provide different time constants for the integrator circuit. The output of the integrator circuit is supplied as input to a voltage controlled oscillator 33, via an amplifier 101.

The voltage controlled oscillator 33 thus provides an output sequence of pulses to a monostable multivibrator 34 which shapes the pulses for counting purposes and provides output count pulses at a rate controlled by the oscillation frequency of the voltage controlled oscialltor 33. Thus monostable multivibrator 34 provides a sequence of count pulses in a wave form compatible for digital counting purposes to the AND gate 35. The rate or frequency of these pulses is controlled via the frequency of the voltage controlled osciallator 33, which is related through the function generator 43 to the borehole fluid salinity. Function generator 43 is calibrated according to laboratory measurements relating borehole fluid salinity to thermal neutron population decay time.

It will be recalled that at the beginning of a cycle of operation upon receipt of the sync pulse that the flip flop 26 is placed in a set condition by the sync pulse being supplied on line 20. This conditions AND gate 35 by placing the conditioning voltage level necessary for this purpose on line 35a. Thus, the AND gate 35 is conditioned to pass the variable frequency count pulses from monostable vibrator 34 into the $t_1$ register 23 when this condition occurs. The $t_1$ register 23 is preset to a relative time delay by switch settings manually set in switch bank 47.

When the variable frequency clock pulses from gate 35 begin to be passed into the $t_1$ register 23, the register 23 counts down the preset conditions entered in switches 47 until a zero condition is reached in register 23. When this occurs an output voltage level is supplied on line 23a, to flip flop 26 which causes a change of state of flip flop 26. This change of state causes flip flop 26 to place a conditioning pulse on line 26a which is applied to one input of AND gate 37. The opposite input of AND gate 37 is supplied with one megahertz clock pulses from a clock generator 28 via previously conditioned AND gate 36. Thus, after the time delay $t_1$ has occurred, clock pulses are permitted to pass through AND gate 37 and are applied to $\Delta\ t_1$ register 25 and $\Delta\ t_2$ register 24 via line 37a. $\Delta\ t_1$ register 25 is preloaded with a time setting from switches 40 which corresponds to the desired time interval for the gate $G_1$ (FIGS. 1 and 2) to be opened for passing capture gamma ray pulses from the downhole tool 11 to appropriate processing circuitry. Similarly, $\Delta\ t_2$ register 24 is preloaded with time setting from switches 39 corresponding to the desired delay gate opening time for gate $G_2$ (FIGS. 1 and 2) for this purpose. Thus, when the $t_1$ register 23 has counted down to zero, one megahertz clock pulses begin to be supplied to the registers 25 and 24 and cause the contents of these registers to be counted down to zero. When the contents of $\Delta\ t_1$ register 25 equals zero the conditioning pulse applied on line 25a to AND gate 45 to open the gate 45 for passage of downhole data pulses is removed. Similarly, when the register 24 has counted to zero, the conditioning pulse to AND gate 46 is removed from line 24a.

While the time gates 45 and 46 are open the detector signals from the downhole tool are supplied on line 18a from the pick off circuit 18 to a pulse height discriminator circuit 44. This pulse height discriminator circuit 44 is set to exclude data pulses below a preselected threshold limit which is chosen, for example to prevent the counting of data pulses from radioactive iodine in the detector crystal 14, if a scintillation type detector is used. Thus, only data pulses above the preselected pulse height threshold are passed from the pulse height discriminator 44 to the data processing circuitry.

Detector data pulses from the downhole tool are supplied via pulse height discriminator 44 to the AND gates 45 and 46 which are conditioned via lines 24a and 25a in the manner previously described to pass these pulses to a thermal neutron capture cross-section (or Sigma, $\Sigma$) computing circuit 41 during the gate open time intervals $G_1$ and $G_2$. The thermal neutron capture cross-section computing circuit 41 then computes, from the counts measured during the two gating intervals, the thermal neutron capture cross-section $\Sigma$ of the earth formations in the vicinity of downhole instrument 11. These data are then supplied via line 41a to a data recorder 42 where they are recorded or logged as a function of borehole depth. The recorder 42 is mechanically or electrically linked (as indicated by dotted line 42a) to the depth indicator for this purpose.

When the $\Delta\ t_2$ register 24 has finally been reduced to zero by counting down the one megahertz clock signals, a trigger pulse is supplied on line 37a. This reset pulse signals monostable multivibrator 38 to provide a reset pulse on line 38a, to flip flop 27. This reset or change of state of flip flop 27 changes the conditioning voltage level supplied on line 27a to AND gate 36 and causes the cessation of the passage of clock pulses from the one megahertz clock generator 28 to the counting registers 24 and 25. Thus no conditioning voltage levels are supplied to flip flop 27 until the receipt of the next "sync" pulse from the downhole instrument. When the downhole instrument supplies the next sync pulse, the entire cycle is repeated as monostable multivibrator and differentator 19 recondition the circuits as previously described to begin another cycle of operation.

With appropriate electronic changes, it may be possible if desired to conduct the entire safe optimization procedure in the sonde, sending only the processed signals (such as $\Sigma$) to the surface.

To summarize, the operation of the embodiment of the invention illustrated in FIG. 3, conductivity electrodes 15 and 16 on the downhole instrument measure a current proportional to the salinity of the borehole fluid. This signal is supplied to function generator 43 which determines the clock rate of a voltage controlled oscillator 33 in proportion to the thermal neutron capture cross $\Sigma$ section of the borehole component in such a manner as to optimize the delay time $t_1$ to the opening measurement time gate following the burst of neutrons from the downhole neutron generator. After the time delay is achieved in this manner, then the one megahertz clock oscillator 28 is allowed to determine (by counting down preset gate intervals in registers 24 and 25) the time duration for which gates $G_1$ and $G_2$ (and any background gates desired) are opened to receive detector count signals from the downhole instrument. During the open gate intervals data signals are supplied to the data processing circuit 41 which computes the thermal neutron macroscopic cross-section $\Sigma$ of the earth formations in the vicinity of the downhole instrument.

The system of the present invention optimizes the delay time to the opening of time gate $G_1$ to measure the thermal neutron capture cross-section $\Sigma$ of the earth formation. Utilizing the system of the present invention the borehole component of thermal neutron capture may be allowed to die away unit its effects are inconsequential before opening the gate to count the capture gamma rays of thermal neutron population die away caused by the capture of thermalized neutrons in the earth formations surrounding the borehole. Since this system measures the borehole salinity, and sets the time gate delay according to the measured salinity, it is made insensitive to salinity changes in the borehole which can confound and confuse the prior art sliding gate type thermal neutron decay time system. Similarly, since only the minimum or optimum time delay is chosen each time before opening the count gates, the limitations of a long fixed time delay system, such as the first previously discussed prior art system, are also avoided. Optimum counting statistics in the intervals are assured since the count gates are opened as soon as possible following borehole component die away.

The foregoing description may make changes and modifications to the preferred embodiment apparent to those skilled in the art. It is therefore, the aim in the appended claims to cover all such changes and modifications that fall within the true spirit and scope of the invention.

We claim:

1. A system for measuring the rate of decrease of the thermal neutron population in earth formations in the vicinity of a fluid filled well borehole, comprising:

means for repetitively generating bursts of fast neutrons which are slowed down to thermal energy and captured by the nuclei of materials in earth formations in the vicinity of a well borehole;

means for detecting radiations indicative of the population of thermal neutrons in the vicinity of the borehole in at least two discrete time intervals subsequent to said repetitive bursts of fast neutrons;

means for measuring the electrical conductivity of the borehole fluid and for generating a signal representative thereof;

means responsive to said representative signal for adjusting a time delay relative to said repetitive bursts as a function thereof for establishing said time delay to the beginning of said at least two discrete time intervals for detecting said radiations indicative of the population of thermal neutrons in the vicinity of the borehole; and means for determining as a function of said detected radiations in said at least two discrete time intervals following said repetitive bursts, the rate of decrease of the thermal neutron population in earth formations in the vicinity of the borehole.

2. The system of claim 1 wherein said detecting means comprises means for detecting thermal neutrons.

3. The system of claim 1 wherein said detecting means comprises means for detecting gamma radiation resulting from the capture of thermal neutrons by the nuclei of materials in the vicinity of the borehole.

4. The system of claim 1 wherein said means for measuring the electrical conductivity of the borehole fluid comprises a current emitting electrode and a measurement electrode.

5. The system of claim 1 wherein said means for establishing a time delay comprises means for functionally relating the measured electrical conductivity of the borehole fluid to the thermal neutron decay constant of the borehole fluid.

6. The system of claim 1 wherein said means for emitting repetitive bursts of fast neutrons comprises a deuterium-tritium accelerator tube type neutron source.

7. The system of claim 1 wherein said at least two discrete time intervals comprise two discrete time gates, not overlapping in time, and each being approximately 200 microseconds duration.

8. The system of claim 1 wherein said time delay which is established from the measurement of the borehole fluid conductivity comprises a time delay approximately equal to the thermal neutron decay constant of the borehole fluid.

9. The system of claim 1 and further including means for generating synchronization pulses representative of the emission of each of said repetitive bursts of fast neutrons.

10. The system of claim 1 wherein said time delay commences relative to the cessation of each repetitive burst of fast neutrons and said at least two discrete time intervals occur following each such repetitive burst of fast neutrons.

* * * * *